(12) United States Patent
Suzuki

(10) Patent No.: US 11,044,289 B2
(45) Date of Patent: Jun. 22, 2021

(54) SENDING DEVICE, RECEIVING DEVICE, INFORMATION PROCESSING METHOD FOR SENDING OR RECEIVING CONTENT DIVIDED INTO SEGMENTS USING MPEG-DASH PROTOCOL

(71) Applicant: CANON KABUSHIKI KAISHA, Tokyo (JP)

(72) Inventor: Seiji Suzuki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/562,301

(22) Filed: Sep. 5, 2019

(65) Prior Publication Data

US 2019/0394249 A1 Dec. 26, 2019

Related U.S. Application Data

(63) Continuation of application No. PCT/JP2018/007034, filed on Feb. 26, 2018.

(30) Foreign Application Priority Data

Mar. 9, 2017 (JP) .............................. JP2017-044710

(51) Int. Cl.
*H04N 21/218* (2011.01)
*H04L 29/06* (2006.01)
(Continued)

(52) U.S. Cl.
CPC ...... *H04L 65/4076* (2013.01); *H04L 65/4084* (2013.01); *H04L 65/602* (2013.01);
(Continued)

(58) Field of Classification Search
CPC ............ H04L 65/4076; H04L 65/4084; H04L 65/602; H04L 65/604; H04L 65/607; H04L 65/608; H04L 67/02; H04L 67/06; H04L 1/00; H04N 5/232; H04N 7/18; H04N 13/161; H04N 13/178; H04N 13/194; H04N 21/21805; H04N 21/235; H04N 21/266; H04N 21/462; H04N 21/8456; H04N 21/85406; H04N 21/234345;
(Continued)

(56) References Cited

U.S. PATENT DOCUMENTS

2017/0078447 A1* 3/2017 Hancock ................. G06F 3/013
2017/0094366 A1* 3/2017 Oguchi .............. H04N 21/4828
(Continued)

FOREIGN PATENT DOCUMENTS

| JP | 2007150747 A | 6/2007 |
|---|---|---|
| JP | 2013090295 A | 5/2013 |

(Continued)

*Primary Examiner* — Le H Luu
(74) *Attorney, Agent, or Firm* — Canon U.S.A., Inc. IP Division

(57) ABSTRACT

A sending device that sends, to a receiving device, a content divided into segments includes a generating unit configured to generate data containing information that allows access to each segment, and a communication control unit configured to send, to the receiving device, data generated by the generating unit. The communication control unit is further configured to send, to the receiving device, video area information of each segment.

15 Claims, 9 Drawing Sheets

(51) Int. Cl.

| | | |
|---|---|---|
| *H04N 13/178* | (2018.01) | |
| *H04N 13/194* | (2018.01) | |
| *H04N 13/161* | (2018.01) | |
| *H04N 21/266* | (2011.01) | |
| *H04N 21/854* | (2011.01) | |
| *H04N 21/462* | (2011.01) | |
| *H04N 5/232* | (2006.01) | |
| *H04N 21/235* | (2011.01) | |
| *H04L 29/08* | (2006.01) | |
| *H04N 7/18* | (2006.01) | |
| *H04N 21/845* | (2011.01) | |

(52) U.S. Cl.
CPC .......... *H04L 65/604* (2013.01); *H04L 65/607* (2013.01); *H04L 67/02* (2013.01); *H04N 5/232* (2013.01); *H04N 7/18* (2013.01); *H04N 13/161* (2018.05); *H04N 13/178* (2018.05); *H04N 13/194* (2018.05); *H04N 21/21805* (2013.01); *H04N 21/235* (2013.01); *H04N 21/266* (2013.01); *H04N 21/462* (2013.01); *H04N 21/8456* (2013.01); *H04N 21/85406* (2013.01)

(58) Field of Classification Search
CPC .... H04N 21/4828; H04N 19/70; G02B 5/208; G06F 3/013
See application file for complete search history.

(56) References Cited

U.S. PATENT DOCUMENTS

| | | | |
|---|---|---|---|
| 2017/0111205 A1* | 4/2017 | Kasher | H04L 1/00 |
| 2017/0126975 A1* | 5/2017 | Duran | G02B 5/208 |
| 2017/0155912 A1* | 6/2017 | Thomas | H04L 67/02 |
| 2017/0223083 A1* | 8/2017 | Maze | H04L 65/608 |
| 2019/0037250 A1* | 1/2019 | Tsukagoshi | H04N 19/70 |
| 2019/0045269 A1* | 2/2019 | Fujimori | H04N 21/440245 |

FOREIGN PATENT DOCUMENTS

| | | |
|---|---|---|
| JP | 2016105593 A | 6/2016 |
| WO | 2015/008613 A1 | 1/2015 |
| WO | 2016199608 A1 | 12/2016 |

\* cited by examiner

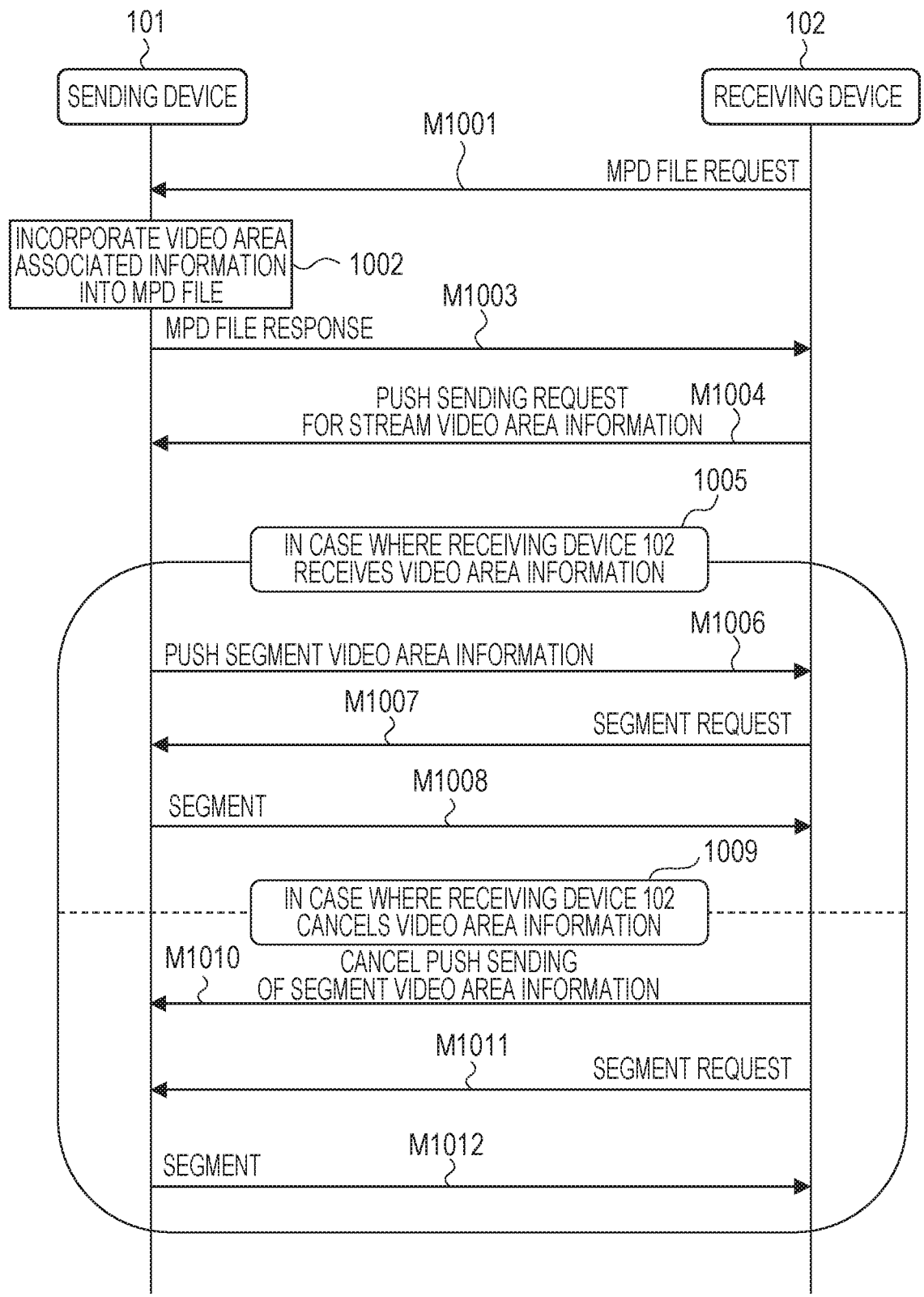

SENDING DEVICE, RECEIVING DEVICE, INFORMATION PROCESSING METHOD FOR SENDING OR RECEIVING CONTENT DIVIDED INTO SEGMENTS USING MPEG-DASH PROTOCOL

CROSS-REFERENCE TO RELATED APPLICATIONS

This application is a Continuation or International Patent Application No. PCT/JP2018/007034, filed Feb. 26, 2018, which claims the benefit of Japanese Patent Application No. 2017-044710, filed Mar. 9, 2017, both of which are hereby incorporated by reference herein in their entirety.

TECHNICAL FIELD

The present invention relates to a sending device, a receiving device, an information processing method, and a storage medium.

BACKGROUND ART

In recent years, distribution systems that distribute streaming contents containing audio data, video data, and other data to users in real time are provided. With such distribution systems, users can enjoy desired contents, such as live video, in real time via users' own terminal devices. With the proliferation of terminals, such as smartphones and tablets, there are growing needs to enjoy streaming contents any time, anywhere with various terminal devices. To meet the needs, technologies (MPEG-DASH, Http Live Streaming, and the like) for dynamically changing streams to acquire according to the capabilities of terminal devices and communication conditions where the terminal devices are placed have become a focus of attention. With these technologies, video data is divided into segments in minute time unit, and uniform resource locators (URLs) for acquiring the segments are described in a file called a playlist. A receiving device initially acquires the playlist and acquires desired video data by using information described in the playlist. URLs for video data segments of a plurality of versions are contained in a playlist. Thus, the receiving device can acquire video data segments of an optimal version according to its own capability and the communication environment. On the other hand, in recent years, distribution systems that distribute all-sky video data captured by all-sky image capturing devices to users in real time are provided. Patent Literature 1 describes a system that distributes 360-degree all-sky video data by using the HTTP streaming technology.

CITATION LIST

Patent Literature

PTL 1 Japanese Patent Laid-Open No. 2016-105593

When the image capturing range of a camera changes during distribution of video captured by the camera, video as intended by a user might not be displayed. For example, in a system in which a change in the image capturing direction of a camera or zoom ratio is reflected in the contents of distributed video, video as intended by a user might not be displayed according to the change.

In other words, for users who want to view in the same direction regardless of a change in the orientation of a camera, it is inconvenient when distributed video changes according to a change in, for example, the orientation of the camera. On the other hand, for users who want to change video according to a change in, for example, the orientation of the camera, it is inconvenient that video in the same range is always displayed.

The present invention facilitates distribution of video intended by a user even when an image capturing range of a camera changes during distribution of video captured by the camera.

SUMMARY OF INVENTION

An aspect of the present invention provides a sending device that sends, to a receiving device, a content divided into segments. The sending device includes a generating unit configured to generate data containing information that allows access to the segments, and a communication control unit configured to send, to the receiving device, the data generated by the generating unit. The communication control unit is further configured to send, to the receiving device, video area information of the segments.

Further features of the present invention will become apparent from the following description of exemplary embodiments with reference to the attached drawings.

BRIEF DESCRIPTION OF DRAWINGS

FIG. 11 is a sequence diagram of a third operation example.

DESCRIPTION OF EMBODIMENTS

Hereinafter, an embodiment of the present invention will be described with reference to the accompanying drawings. In the present embodiment, the description will be made by using MPEG-DASH. The configuration of the present embodiment is applicable not only to MPEG-DASH but also to another protocol for distributing segments of Http Live Streaming, Smooth Streaming, or other streaming.

Regarding All-Sky Video and Video Area Information

Figure 1A:
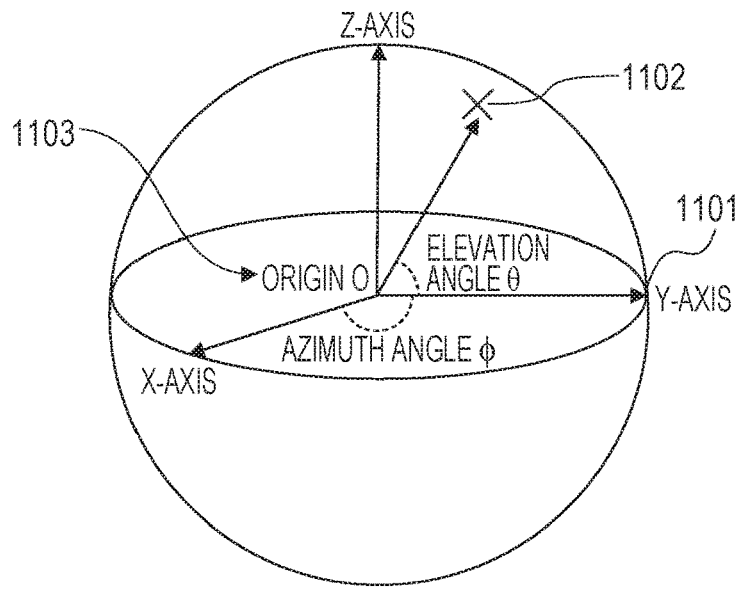
FIG. 1A is a view that shows an example of all-sky video data and its projection method.
Figure 1B:
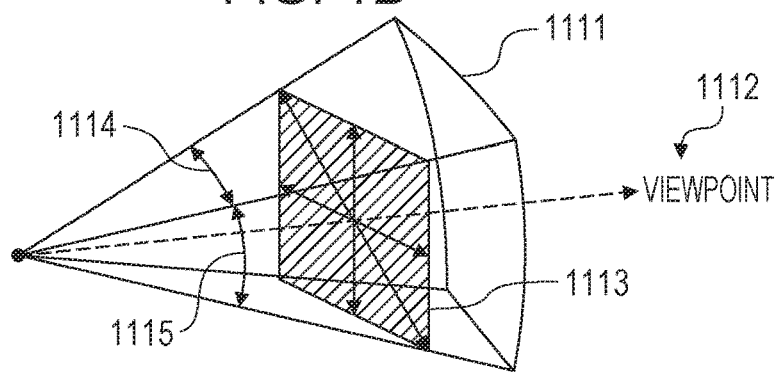
FIG. 1B is a view that shows an example of all-sky video data and its projection method.
Figure 1C:
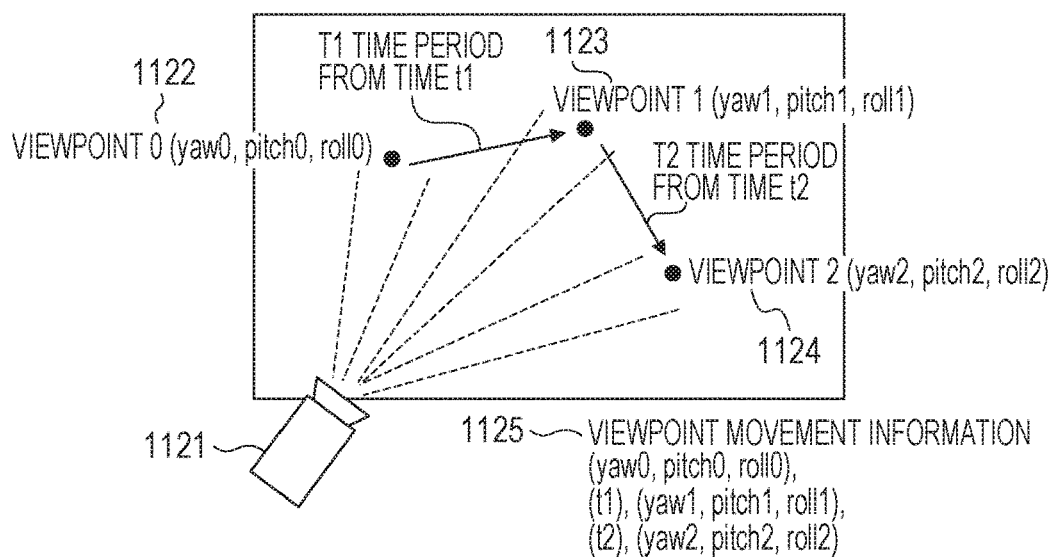
FIG. 1C is a view that shows an example of all-sky video data and its projection method.

FIG. 1A to FIG. 1C are views that show an example of all-sky video data and its projection method. As indicated by

1101 in FIG. 1A, all-sky video is video obtained by capturing the range of surroundings (azimuth angle ϕ=0° to 360°, elevation angle θ=−90° to 90°) about the origin O (1103). All-sky video is called other different names, such as all-around video, virtual reality (VR) video, and 360-degree video. Regardless of these names, the configuration of the present embodiment is applicable. In the present embodiment, an example in which video (moving image) is distributed as an all-sky image having images in all directions in a three-dimensional space will be described. Of course, a still image may also be distributed as an all-sky image. The range of video in which the configuration of the present embodiment is applicable is not limited to video of azimuth angle ϕ=0° to 360°, elevation angle θ=−90° to 90° as indicated by 1101. The configuration of the present embodiment is also applicable to, for example, video in a hemisphere of azimuth angle ϕ=0° to 360°, elevation angle θ=0° to 90° or video of any other azimuth angles and elevation angles. The configuration of the present embodiment is also applicable to all-sky video data, such as right eye data, left eye data, and stereoscopic vision data.

When captured all-sky video is distributed, a projection process of developing all-sky video onto a two-dimensional plane is executed, and the all-sky video is divided into a plurality of tiles. Examples of a method of dividing all-sky video into tiles and encoding the all-sky video include a method of individually encoding each tile and a method of encoding by using tile encoding. The present embodiment is applicable regardless of the manner of encoding. Even when all-sky video is not divided into tiles, the present embodiment is applicable.

When tile-divided all-sky video is stored in a moving image container format, the all-sky video is segmented, that is, the all-sky video is divided into a plurality of moving image files. In the present embodiment, video data stored in a sending device 101 (described later) is segmented into a plurality of however, how video data is stored is not limited thereto. Video data may be stored in a single file. When video data is stored in a single file, a receiving device 102 (described later) acquires segments by designating a specific range (byte range) of the file. Alternatively, all-sky video data projected onto a two-dimensional plane may be divided into a plurality of areas, and, for each of the areas, encoding, storage into a moving image container, and segmentation may be performed. A segment means the unit of video data obtained by spatially or temporally dividing video data.

Video area information is information on the characteristics of areas of tile-divided all-sky video. Viewpoint information, field of view (FOV), viewpoint movement information, viewpoint coordnate information, and observation position information correspond to viteo area information; however, video area information is not limited thereto. Of these pieces of information, at least one type or a combination of multiple types is handled as video area information.

Viewpoint information is the observation direction of video in all-sky video 1111 in FIG. 1B indicates a partial area in all-sky video. A viewpoint for the partial area 1111 is indicated by 1112 that is the observation direction of the area. Viewpoint information is represented by a method using three values, that is, yaw angle, pitch angle, and roll angle; however, the viewpoint information is not limited to this method.

FOV is information that indicates the area of video in all-sky video. FOV consists of two observation angles of divided video areas. For example, FOV in the partial area 1111 in FIG. 1B is an area 1113 shown in a rectangular shape, and a horizontal FOV angle 1114 and a vertical FOV angle 1115 that represent the area correspond to two observation angles. Another value, such as a diagonal FOV angle, may be used as FOV.

Viewpoint movement information is information that represents how viewpoint information moves. FIG. 1C shows an example regarding viewpoint movement information. In filming video of a segment, it is assumed that a camera 1121 in filming takes a T1 time period from time t1 to move the filming direction from viewpoint 0 indicated by 1122 to viewpoint 1 indicated by 1123 and then takes a T2 time period from time t2 to move to viewpoint 2 indicated by 1124. In the case of this example, viewpoint movement information 1125 is represented by "(viewpoint 0), (moving start time, moving time period), (viewpoint 1), (moving start time, moving time period), (viewpoint 2)=(yaw0, pitch0, roll0), (t1, T1), (yaw1, pitch, roll1), (t2, T2), (yaw2, pitch2, roll2)" so that the start point of a viewpoint, moving start time, a time period taken for movement, and the end point of the viewpoint. As long as a point to which a viewpoint moves, moving start time, and a moving time period are represented, viewpoint movement information may be represented by another method, such as expressing the trajectory of a viewpoint in a mathematical expression using a vector.

Viewpoint coordinate information is information that indicates which position in tile-divided video a specific observation direction is. Viewpoint coordinate information is represented by pixel coordinates together with a yaw angle, a pitch angle, and a roll angle representing an observation direction; however, viewpoint coordinate information is not limited to this method. When the observation direction changes in video like video movement information, the trajectory of movement of viewpoint coordinate information may be shown by, for example, containing information on a time period that is taken to change between pixel coordinates. Viewpoint coordinate information may be coordinates of an observation direction or object, which the receiving device 102 requests, or coordinates corresponding to an observation direction or object, which the sending device 101 intends to get focused on in video by the receiving device 102; however, viewpoint coordinate information is not limited thereto.

Observation position information is a position at which tile-divided video in all-sky video is being observed. In the case of video that a camera filming, the position of the camera in filming is observation position information. Observation position information is represented by longitude and latitude; however, observation position information is not limited to this method and may further include, for example, altitude.

Configuration of Overall System

Figure 2:
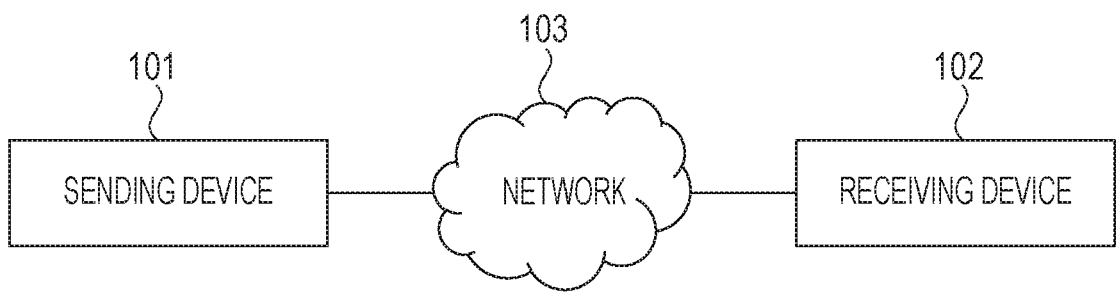
FIG. 2 is a diagram that shows an example of the system configuration of an information processing system.

FIG. 2 is a diagram that shows an example of the system configuration of an information processing system. The sending device 101 is connected to the receiving device 102 via a network 103. The sending device 101 and the receiving device 102 each may be included in multiple numbers.

The sending device 101 has a function of sending a content and may have a function of receiving inputt, from a user. Further specific examples of the sending device 101 include a camera device, a video camera device, a smartphone device, a PC device, and a cellular phone; however, the sending device 101 is not limited thereto as long as the sending device 101 has the above-described function.

The receiving device 102 has a function of reproducing and displaying a content, and a communication function and may nave a function of receiving input from a user. Further specific examples of the receiving device 102 include a smartphone device, a PC device, a television, and a cellular phone; however, the receiving device 102 is not limited thereto as long as the receiving device 102 satisfies the above-described functional configuration.

The network 103 is a wired local area network (LAN) or a wireless LAN. In the present embodiment, a wired LAN or a wireless LAN is used as the network 103; however, the network 103 is not limited thereto. The network 103 may be a wide area network (WAN), a personal area network (PAN), or another network.

Hardware Configuration of Sending Device

Figure 3:
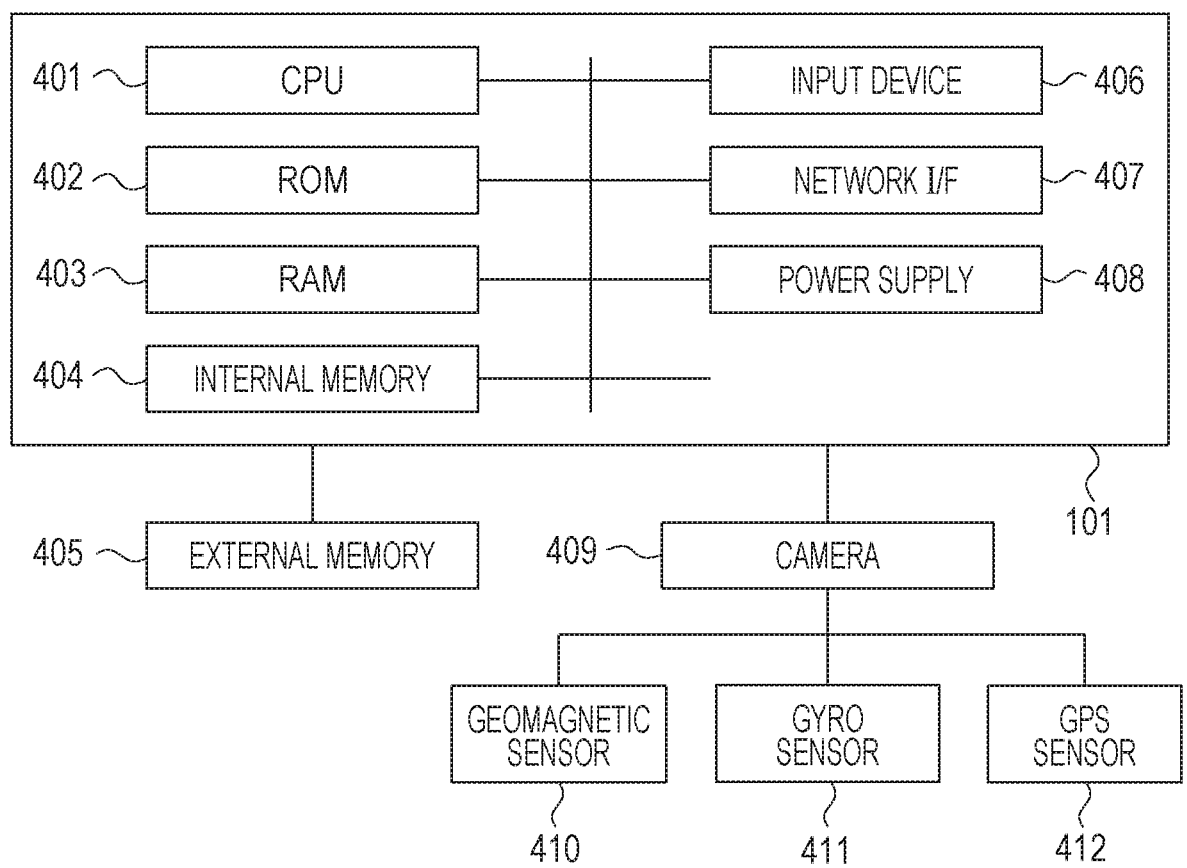
FIG. 3 is a diagram that shows an example of the hardware configuration of a sending device.

FIG. 3 is a diagram that shows an example of the hardware confguration of the sending device 101.

A central processing unit (hereinafter, referred to as CPU) 401 generally controls the sending device 101 and calculates or processes data. The CPU 401 expands a program stored in a ROM 402 (described later) onto a RAM 403 (described later) and runs the program. When the CPU 401 runs the program, an encoding unit 202, a playlist generating unit 203, a segment generating unit 204, a sending data determining unit 205, a video area information management unit 206, and a communication control unit 207 in FIG. 5 (described later), are implemented. When the CPU 401 runs the program, the process of the flowchart of the sending device 101 (described later) and the process of the sending device 101 in the sequence diagrams of FIG. 9 to FIG. 11 (described later) are implemented.

The ROM 402 is a storage device for reading information written once. The ROM 402 stores, for example, the program that the CPU 401 runs, or the like.

The RAM 403 is a storage device for temporarily writing and reading data. The RAM 403 stores, for example, values or other data that is used when the CPU 401 runs the program.

An internal memory 404 and an external memory 405 are external storage devices that store contents of applications.

An input device 406 is an input device that is implemented as a button, or the like, such as a power button, a volume button, and a home button. A plurality of the input devices 406 may be provided on the sending device 101.

A network I/F 407 is a device for sending or receiving data via the network 103. The communication control unit 207 in FIG. 5 (described later) controls communication with the receiving device 102 via the network I/F 407 and the network 103.

A power supply 408 is a device that supplies or charges power to the sending device 101. The power supply 408 includes a battery and a charging device.

A camera 409 is a device that films a sending content. The camera 409 is a device that implements an image capturing unit 201 in FIG. 5 (described later). The camera 409 includes sensors for video area information, that is, a geomagnetic sensor 410, a gyro sensor 411, and a GPS sensor 412. The camera 409 may be configured to include only part of the sensors 410 to 412 or may include a sensor other than the sensors 410 to 412.

Hardware Configuration of Receiving Device

Figure 4:
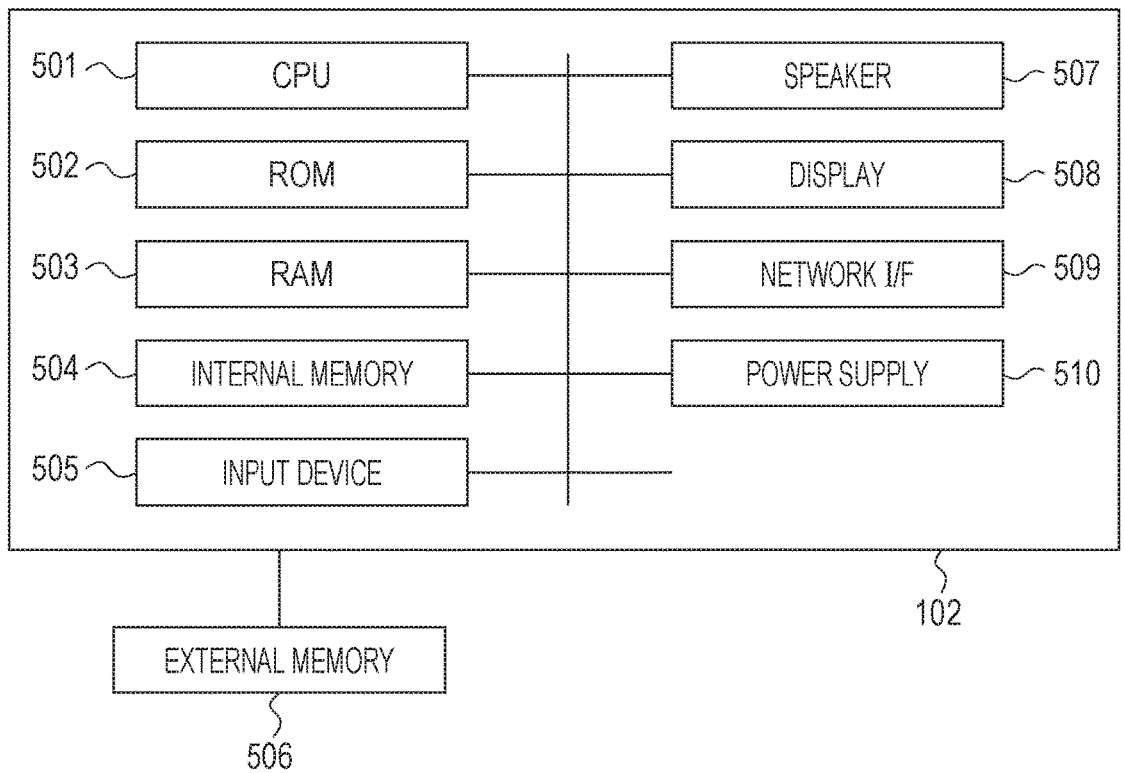
FIG. 4 is a diagram that shows an example of the hardware configuration of a receiving device.

FIG. 4 is a diagram that shows an example of the hardware configuration of the receiving device 102.

A central processing unit (hereinafter, referred to as CPU) 501 generally controls the receiving device 102 and calculates or processes data. The CPU 501 expands a program stored in a ROM 502 (described later) onto a RAM 503 (described later) and runs the program. When the CPU 501 runs the program, a decoding unit 302, a playlist analyzing unit 303, a video area information acquisition instruction unit 306, an acquiring segment determining unit 307, and a communication control unit 308 in FIG. 6 (described later).

The ROM 502 is a storage device for reading information written once. The ROM 502 stores, for example, the program that the CPU 501 runs, or the like.

The RAM 503 is a storage device for temporarily writing and reading data. The RAM 503 stores, for example, values or other data that is used when the CPU 501 runs the program.

An internal memory 504 and an external memory 506 are external storage devices that store contents of applications. A buffer 304 in FIG. 6 (described later) is implemented in the internal memory 504. An input device 505 is an input device that is implemented as a button, or the like, such as a power button, a volume button, and a home button.

A plurlity of the input devices 505 may be provided on the receiving device 102.

A speaker 507 and a display 508 are able to reproduce a content received from the sending device 101.

A network I/F 509 is a device for sending or receiving data via the network 103. The communication control unit 308 in FIG. 6 (described later) controls communication with the sending device 101 via the network I/F 509 and the network 103.

A power supply 510 is a device that supplies or charges power to the receiving device 102. The power supply 510 includes a battery and a charging device. The power supply 510 may be implemented by an AC adaptor.

Functional Configuration of Sending Device

Figure 5:
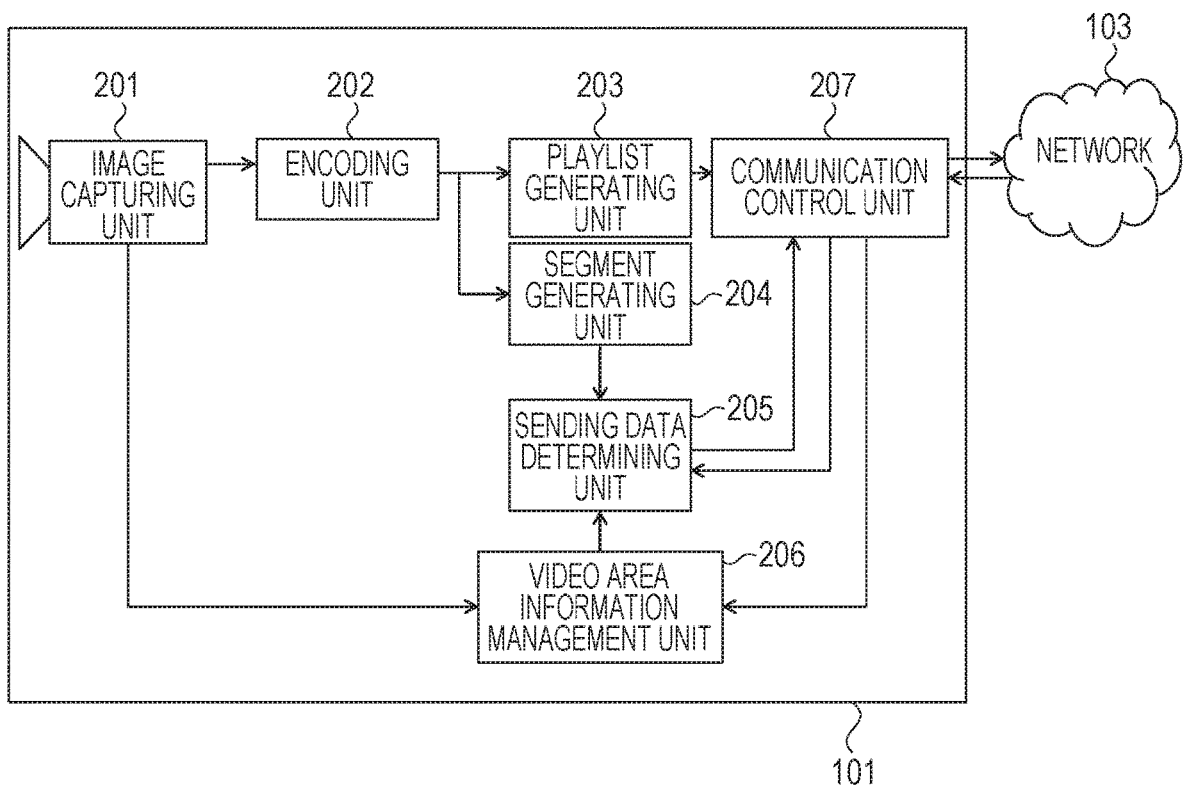
FIG. 5 is a diagram that shows an example of the functional configuration of the sending device.

FIG. 5 is a diagram that shows an example of the functional configuration of the sending device 101. The sending device 101 encodes video data filmed by the image capturing unit 201 or generates video area information. The image capturing unit 201 may be provided outside the sending device 101 and may provide the sending device 101 with video data and video area information. The segment generating unit 204 generates segments that are sending units of video data from the video data encoded by the encoding unit 202. ISO base media file format (BMFF) is used as a file format of segments in the present embodiment; however, the file format is not limited thereto. The file format may be MPEG2TS or another format. The playlist generating unit 203 generates a playlist containing URLs that allow access to the segments generated by the segment generating unit 204. There is a media presentation description (MPD) that is defined in MPEG-DASH as a format of playlist. A format of playlist may be any format having a function equivalent to the above format, such as a method of describing a playlist in Http Live Streaming. The sending data determining unit 205 determines segments and video area information to be sent to the receiving device 102, transfers the segments and the video area information to the communication control unit 207, and causes the communication control unit 207 to send the segments and the video area information. The communication control unit 207 sends the generated playlist, and the video area information and segments determined to be sent, to the receiving device 102 over the network 103. The video area information management unit 206 manages video area information that is acquired from the image capturing unit 201 or manages settings of sending video area information to the receiving device 102.

Functional Configuration of Receiving Device

Figure 6:
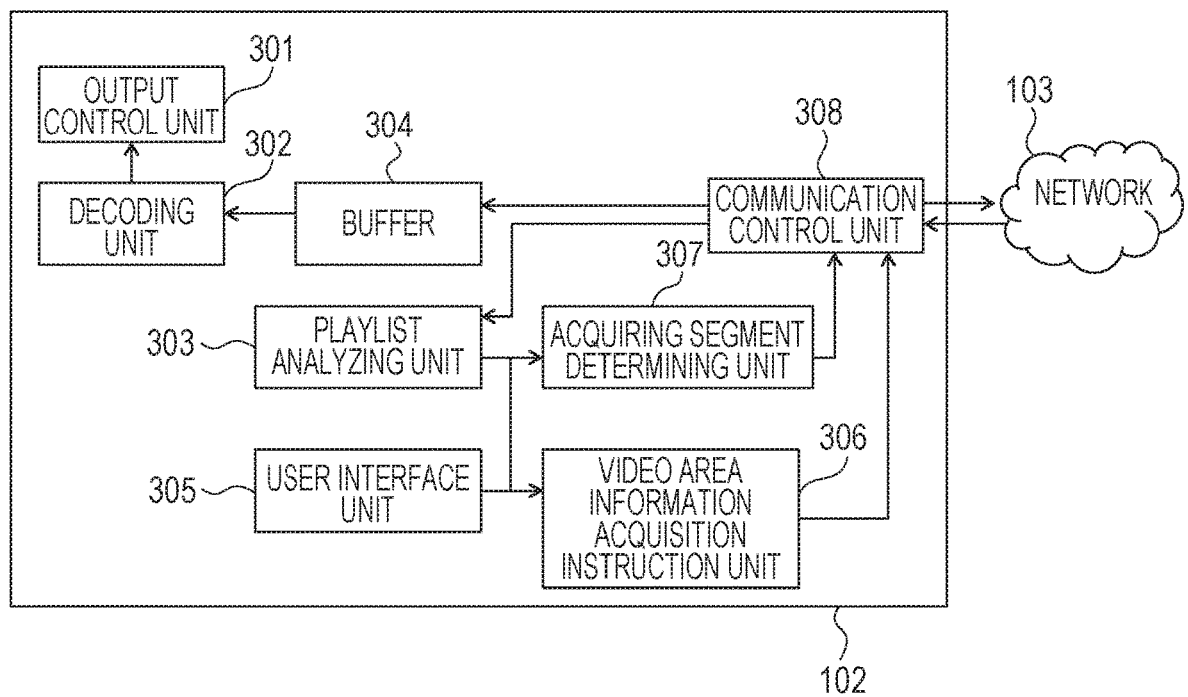
FIG. 6 is a diagram that shows an example of the functional configuration of the receiving device.

FIG. 6 is a diagram that shows an example of the functional configuration of the receiving device 102. The receiving device 102 reproduces video data, which is received over the network 103, with the use of the output control unit 301. The output control unit 301 may be provided outside the receiving device 102 and may provide video data to an external display unit. The communication control unit 308 receives the segments, the video area information, and the playlist over the network 103, transfers the segments and the video area information to the buffer 304, and transfers the playlist to the playlist analyzing unit 303. The decoding unit 302 decodes video data based on the segments and video area information stored in the buffer 304. The acquiring segment determining unit 307 determines segments to acquire based on an analyzed result from the playlist analyzing unit 303 in response to input from a user interface unit 305; however, the configuration is not limited thereto. Alternatively, the acquiring segment determining unit 307 may employ another method, such as determining segments to acquire according to the condition of the network 103. The video area information acquisition instruction unit 306 determines whether to send a request to acquire video area information or a request to stop video area information in response to input from the user interface unit 305; however, the video area information acquisition instruction unit 306 is not limited to this method. The video area information acquisition instruction unit 306 may employ another method, such as determining whether to send according to the condition of the network 103.

Information Processing of Sending Device

The information processing of the sending device 101 in the embodiment will be described with reference to FIG. 7.

Figure 7:
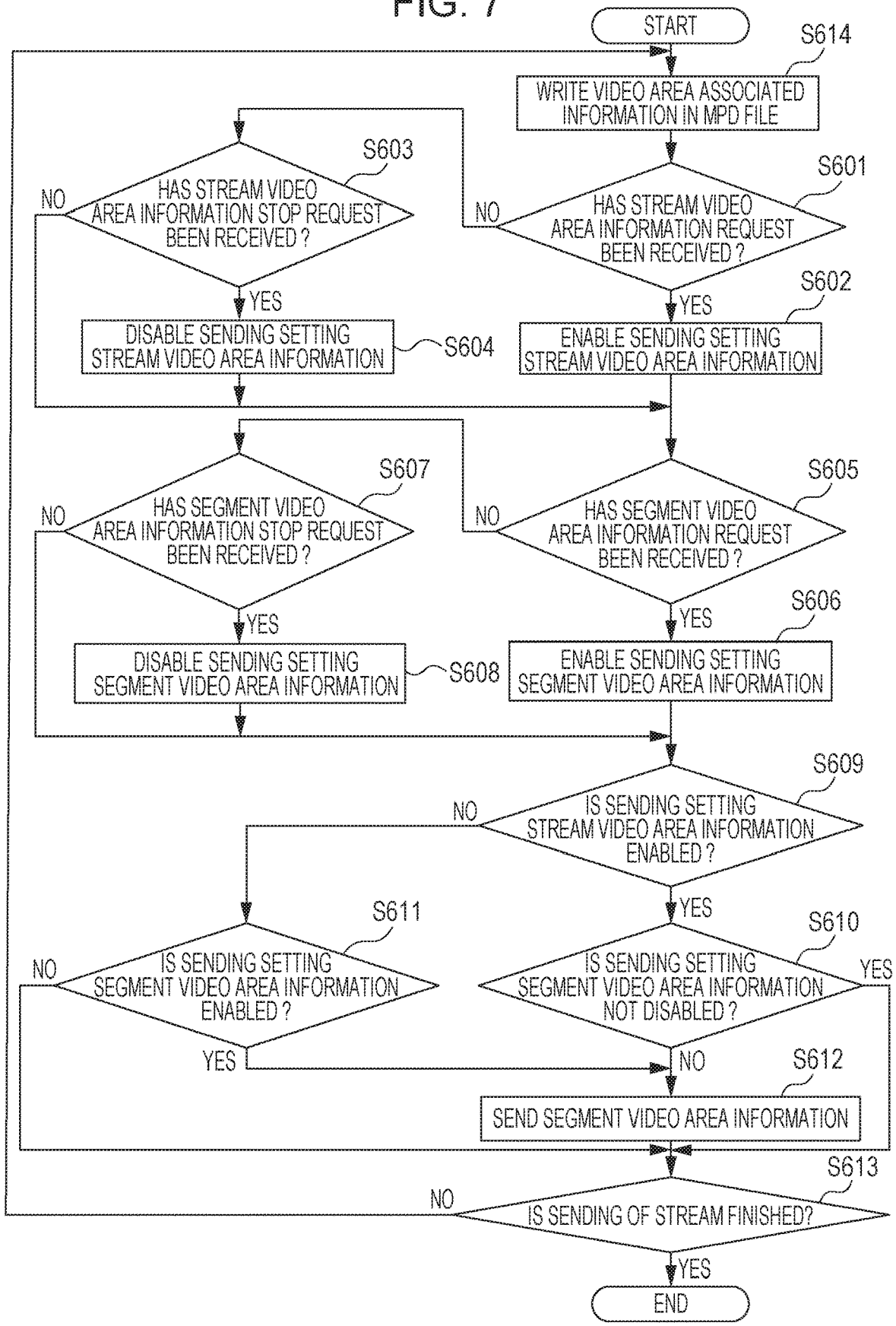
FIG. 7 is a flowchart that shows an example of information processing that is executed by the sending device.

FIG. 7 is a flowchart that shows an example of information processing that is executed by the sending device 101 from reception of a request to acquire video area information or a request to stop video area information until sending of video area information.

The process of S614 will be described later.

In S601, the communication control unit 207 determines whether a stream video area information request has been received. When the communication control unit 207 has received a stream video area information request (YES in S601), the communication control unit 207 proceeds to S602. When the communication control unit 207 has not received a stream video area information request (NO in S601), the communication control unit 207 proceeds to S603. A stream means a collection of segments that are temporally continuous and are exchanged between the sending device 101 and the receiving device 102 A stream video area information request is a request to continue sending video area information of each of segments that make up a stream. A stream video area information request may be a request to continue sending video area information until a stop request is explicitly sent or may be a limited request like "a request to send video area information up to 100 segments". Alternatively, the type(s) of video area information desired to be sent may be designated by a stream video area information request. When viewpoint coordinate information is designated, an observation direction whose coordinate information is desired to be acquired may be contained in a stream video area information request.

In S602, the video area information management unit 206 enables a stream video area information sending setting. The stream video area information sending setting is a set value as to whether to send video area information of each of segments that make up a stream. The stream video area information sending setting has an enabled state and a disabled state. The stream video area information sending setting may have a set value such that video area information is sent when there is a change from video area information sent before. In the present embodiment, the default value of the stream video area information sending setting is an enabled state. Alternatively, the default value may be a disabled state.

In S603, the communication control unit 207 determines whether a stream video area information stop request has been received. When the communication control unit 207 has received a stream video area information stop request (YES in S603), the communication control unit 207 proceeds to S604. When the communication control unit 207 has not received a stream video area information stop request (NO in S603), the communication control unit 207 proceeds to S605. Here, a stream video area information stop request is a request not to send video area information of each of segments that make up a stream.

In S604, the video area information management unit 206 disables the stream video area information sending setting.

The sequence of the processes of S601 to S602 and the processes of S603 to S604 may be reversed. In other words, the sending device 101 may process S603 first and, when negative determination is made in S603, proceed to S601. In addition, the sending device 101 may process S603 (S601) even when affirmative determination is made in S601 (S603).

The sending device 101 may be configured not to support a stream video area information request or a stream video area information stop request but to support only a segment video area information request and a segment video area information stop request (described later). When the sending device 101 does not support a stream video area information request or a stream video area information stop request, the sending device 101 skips S601, S602, S603, and S604.

In S605, the communication control unit 207 determines whether a segment video area information request has been received. When the communication control unit 207 has received a segment video area information request (YES in S605), the communication control unit 207 proceeds to S606. When the communication control unit 207 has not received a segment video area information request (NO in S605), the communication control unit 207 proceeds to S607. A segment video area information request is a request to send video area information of a specific segment(s). A segment video area information request may designate the type (s) of video area information desired to be sent. When viewpoint coordinate information is designated, an observation direction whose coordinate information is desired to be acquired may be contained in a segment video area information request.

In S606, the video area information management unit 206 enables a segment video area information sending setting for a segment concerned in response to the segment video area information request received in S605. The segment video area information sending setting is a setting for whether to send video area information of each segment and is a value that is managed on a segment-by-segment basis. In the present embodiment, the segment video area information sending setting has an enabled state, a disable state, and an unset state; however, an unset state may be omitted. In the present embodiment, the default value of the segment video area information sending setting is an unset state. Alternatively, the default value may be an enabled state or a disabled state.

In the present embodiment, regardless of the value of the stream video area information sending setting, the value of the segment video area information sending setting is preferentially reflected in whether to send video area information. Alternatively, the value of the stream video area information sending setting may be preferentially reflected over the value of the segment, video area information sending setting. This is, for example, the case where, when the stream video area information sending setting is in a disabled state, video areainformation of a segment (s) concerned is not sent even when the segment video area information sending setting is in an enabled state, or another case.

In S607, the communication control unit 207 determines whether a segment video area information stop request has been received. When the communication control unit 207 has received a segment video area information stop request (YES in S607), the communication control unit 207 proceeds to S608. When the communication control unit 207 has not received a segment video area information stop request (NO in S607), the communication control unit 207 proceeds to S609. A segment video area information stop request is a request not to send video area information of a specific segment(s).

In S608, the video area information management unit 206 disables the segment video area information sending setting of a segment(s) concerned in response to the segment video area information request received in S605.

The sequence of the processes of S605 to S606 and the processes of S607 to S608 may be reversed. In other words, the sending device 101 may execute S607 first and, when negative determination is made in S607, proceed to S605. In addition, the sending device 101 may process S607 (S605) even when affirmative determination is made in S605 (S607).

The sending device 101 may be configured not to support a segment video area information request or a segment video area information stop request but to support only a stream video area information request and a stream video area information stop request. When the sending device 101 does not support a segment video area information request or a segment video area information stop request, the sending device 101 skips S605, S606, S607, and S608.

In S609, the communication control unit 207 determines whether the stream video area information sending setting of the video area information management unit 206 is in an enabled state. When the stream video area information sending setting is in an enabled state (YES in S609), the communication control unit 207 proceeds to S610. When the stream video area information sending setting is in a disabled state (NO in S609), the communication control unit 207 proceeds to S611.

In S610, the communication control unit 207 determines whether the segment video area information sending setting of the video area information management unit 206 is not in a disabled state, that is, the segment video area information sending setting is in an enabled state or an unset state. When the segment video area information sending setting is in an enabled state or an unset state (NO in S610), the communication control unit 207 proceeds to S612. When the segment video area information sending setting is in a disabled state (YES in S610), the communication control unit 207 proceeds to S613.

In S611, the communication control unit 207 determines whether the segment video area information sending setting of the video area information management unit 206 is in an enabled state. When the segment video area information sending setting is in an enabled state (YES in S611), the communication control unit 207 proceeds to S612. When the segment video area information sending setting is not in an enabled state, that is, the segment video area information sending setting is in a disabled state or an unset state (NO in S611), the communication control unit 207 proceeds to S613.

In S612, the communication control unit 207 sends video area information of a seqment(s) that is/are allowed to be sent. When the type (s) of video area information to be sent is/are designated in a stream video area sending request and a segment video area sending request, the communication control unit 207 sends video area information of the designated type. When the video area information contains the same details as the video area information sent in S612 before, the communication control unit 207 does not need to send the video area information of the segment(s).

In S613, the communication control unit 207 determines whether to finish sending a stream. When the communication control unit 207 finishes sending a stream (YES in S613), the communication control unit 207 ends the process of the flowchart shown in FIG. 7 When the communication control unit 207 does not finish sending a stream (NO in S613), the communication control unit 207 proceeds to S614. For example, when the communication control unit 207 receives a finish instruction from a user through the input device 406 or when there is no request from the receiving device 102 for a set time period, the communication control unit 207 determines to finish distribution of data and finish sending a stream.

In S614, the playlist generating unit 203 writes video area associated information in an MPD file. Then, the communication control unit 207 sends the generated MPD file. The sending device 101 is not limited to usage of MPD. The sending device 101 may use the one having an equivalent function to that of MPD, such as a method of describing a playlist in Http Live Streaming. Video area associated information includes whether video area information can be acquired, the type of the video area information, protocol information for acquiring the video area information, a URL for identifying the video area. information, and the like. When video area associated information is shared between the sending device 101 and the receiving device 102 with a different method, such as providing video area associated information in advance with a protocol other than MPEG-DASH, the video area associated information does not need to be written in an MPD file. When the sending device 101 has once processed S614, the sending device 101 does not need to process S614 again or may process S614 multiple times. The MPD file is an example of data containing information that allows access to a segment.

Information Processing of Receiving Device

The information processing of the receiving device 102 in the embodiment will be described with reference to FIG. 8.

Figure 8:
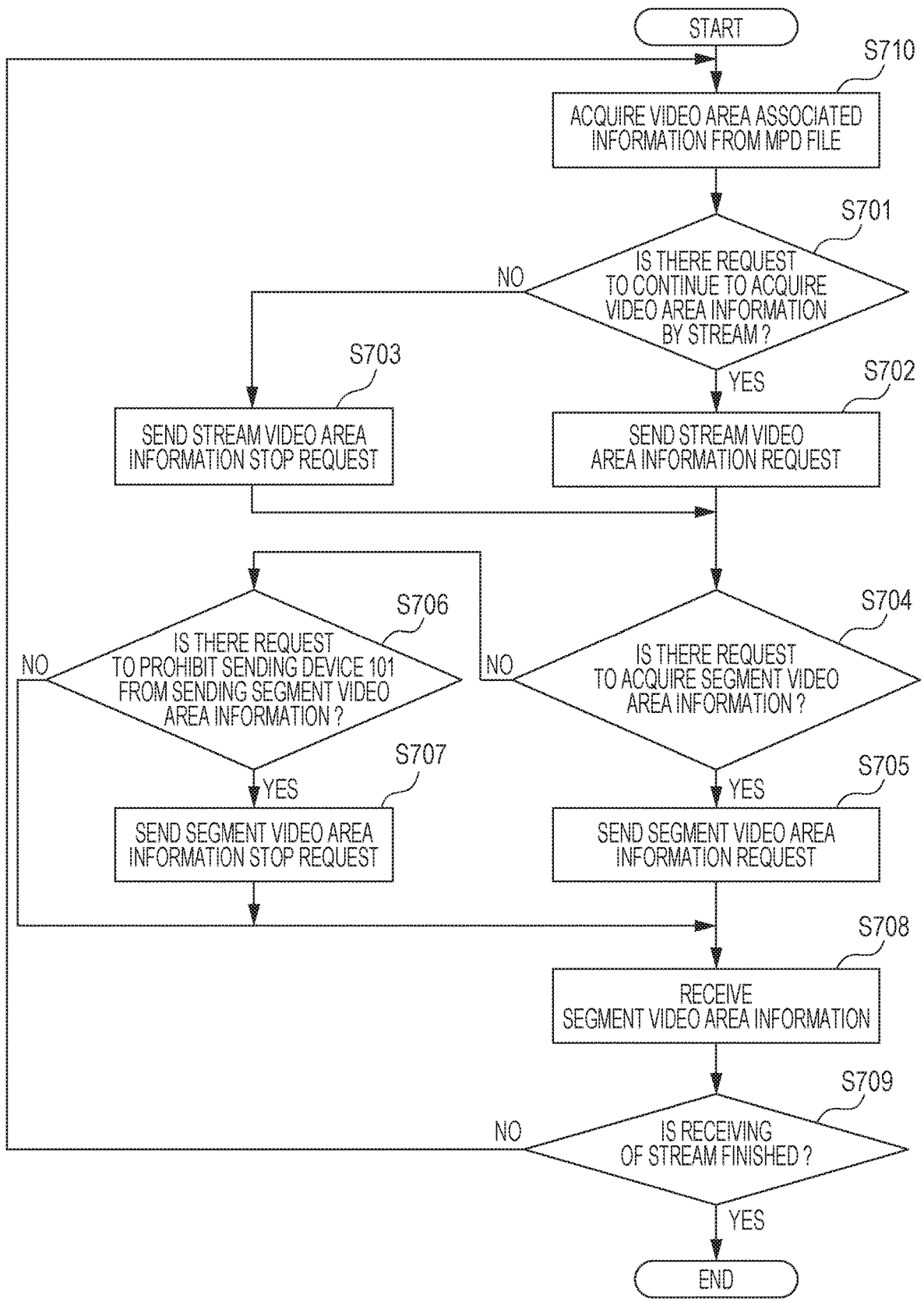
FIG. 8 is a flowchart that shows an example of information processing that is executed by the receiving device.

FIG. 8 is a flowchart that shows an example of information processing that is executed by the receiving device 102 from sending of a request to acquire video area information or a request to stop video area information until reception of video area information.

The process of S710 will be described later.

In S701, the video area information acquisition instruction unit 306 determines whether to intend to continue receiving video area information of each of segments that make up a stream. When the video area information acquisition instruction unit 306 intends to continue receiving the video area information of each of segments that make up a stream (YES in S701), the video area information acquisition instruction unit 306 proceeds to S702. When the video area information acquisition instruction unit 306 does not intend to continue receiving the video area information of each of segments that make up a stream (NO in S701), the video area information acquisition instruction unit 306 proceeds to S703.

In S702, the communication control unit 308 sends a stream video area information request based on an instruction from the video area information acquisition instruction unit 306. For example, the video area information acquisition instruction unit 306 may provide an instruction to set a stream video area information request to a request to continue sending video area information until explicit sending of a stop request. Alternatively, for example, the video area information acquisition instruction unit 306 may set a stream video area information request to a limited request like "a request to send video area information of up to 100 segments". For example, the video area information acquisition instruction unit 306 may designate the type of video area information desired to be sent, in a stream video area information request. Alternatively, for example, when the video area information acquisition instruction unit 306 designates viewpoint coordinate information, the video area information acquisition instruction unit 306 may provide an instruction to incorporate an observation direction whose coordinate information is desired to be acquired into a stream video area information request. Alternatively, for example, the video area information acquisition instruction unit 306 may provide an instruction to set a stream video area information request to a request to send video area information only when the details of the video area information have changed. The receiving device 102 has already sent a stream video area information request to the sending device 101 and the stream video area information sending setting of the sending device 101 is in an enabled state, the receiving device 102 does not need to send a stream video area information request again. Alternatively, when a stream video area information sending setting is already in an enabled state, such as when the default value of the stream video area information sending setting of the sending device 101 is in an enabled state even when the receiving device 102 has not sent a stream video area information request, the receiving device 102 does not need to send a stream video area information request.

In S703, the communication control unit 308 sends a stream video area information stop request based on an instruction from the video area information acquisition instruction unit 306. When the receiving device 102 has already sent a stream video area information stop request to the sending device 101 and the stream video area information sending setting of the sending device 101 is in a disabled state, the receiving device 102 does not need to send a stream video area information stop request again. Alternatively, when a stream video area information sending setting is already in a disabled state, such as when the default value of the stream video area information sending setting of the sending device 101 is in a disabled state even when the receiving device 102 has not sent a stream video area information stop request, the receiving device 102 does not need to send a stream video area information stop request.

When the sending device 101 does not support a stream video area information request or a stream video area information stop request, the receiving device 102 skips S701, S702, and S703.

In S704, the acquiring segment determining unit 307 determines whether to intend to acquire video area information of a specific segment(s). When the acquiring segment determining unit 307 intends to acquire video area information of a specific segment(s) (YES in S704), the acquiring segment determining unit 307 proceeds to S705. When the acquiring segment determining unit 307 does not intend to acquire video area information of a specific segment(s) (NO in S704), the acquiring segment determining unit 307 proceeds to S706.

In S705, the communication control unit 308 sends a segment video area information request for the segment(s) determined as the segment (s) whose video area information intended to be acquired by the acquiring segment determining unit 307. For example, the acquiring segment determining unit 307 may designate the type (s) of video area information, which is/are desired to be sent by a segment video area information request. When viewpoint coordinate information is desighated, the acquiring segment determining unit 307 may incorporate the observation direction whose coordinate information is intended to be acquired into a segment video area information request. When the receiving device 102 has sent a stream video area information request and has enabled the stream video area information sending setting of the sending device 101 in S702, the receiving device 102 does not need to send a segment video area information request. Alternatively, when a stream video area information sending setting is already in an enabled state, such as when the default value of the stream video area information sending setting of the sending device 101 is in an enabled state even when the receiving device 102 has not sent a stream video area information request, the receiving device 102 does not need to send a segment video area information request.

In S706, the acquiring segment determining unit 307 determines whether to prohibit the sending device 101 from sending video area information of a specific segment(s). When the acquiring segment determining unit 307 prohibits the sending device 101 from sending video area information of a specific segment(a) (YES in S706), the acquiring segment determining unit 307 proceeds to S707. When the acquiring segment determining unit 307 does not prohibit the sending device 101 from sending video area information of a specific segment (s) (NO in S706), the acquiring segment determining unit 307 proceeds to S708.

In S707, the communication control unit 308 sends a segment video area information stop request for a segment (s) whose video area information is prohibited from being sent in S705 based on an instruction from the acquiring segment determining unit 307. When the stream video area information sending setting of the sending device 101 is in a disabled state, the receiving device 102 does not need to send a segment video area information stop request.

When the sending device 101 does not support a segment video area information request or a segment video area information stop request, the receiving device 102 skips S704, S705, S706, and S707.

In S708, when the sending device 101 has sent video area information of a segment(s), the communication control unit 308 receives the video area information of the segment(s).

In S709, the communication control unit 308 determines whether to finish receiving a stream. When the communication control unit 308 finishes receiving a stream (YES in S709), the communication control unit 308 ends the process of the flowchart shown in FIG. 8. When the communication control unit 308 does not finish receiving a stream (NO in S709), the communication control unit 308 proceeds to S710. For example, when the communication control unit 308 receives a finish instruction from a user through the input device 505, the communication control unit 308 determines to finish receiving data.

In S710, the communication control unit 308 receives an MPD file. Then, the playlist analyzing unit 303 acquires video area associated information from the MPD file. The receiving device 102 is not limited to usage of MPD. The receiving device 102 may use the one having an equivalent function to that of MPD, such as a method of describing a playlist in Http Live Streaming. When video area associated information is shared between the sending device 101 and the receiving device 102 with a different method, such as acquiring video area associated information, in advance with a protocol other than MPEG-DASH, the video area associated information does not need to be acquired from the MPD file. When the receiving device 102 has once processed S710, the receiving device 102 does not need to process S710 again or may process S710 multiple times.

First Operation Example

Figure 9:
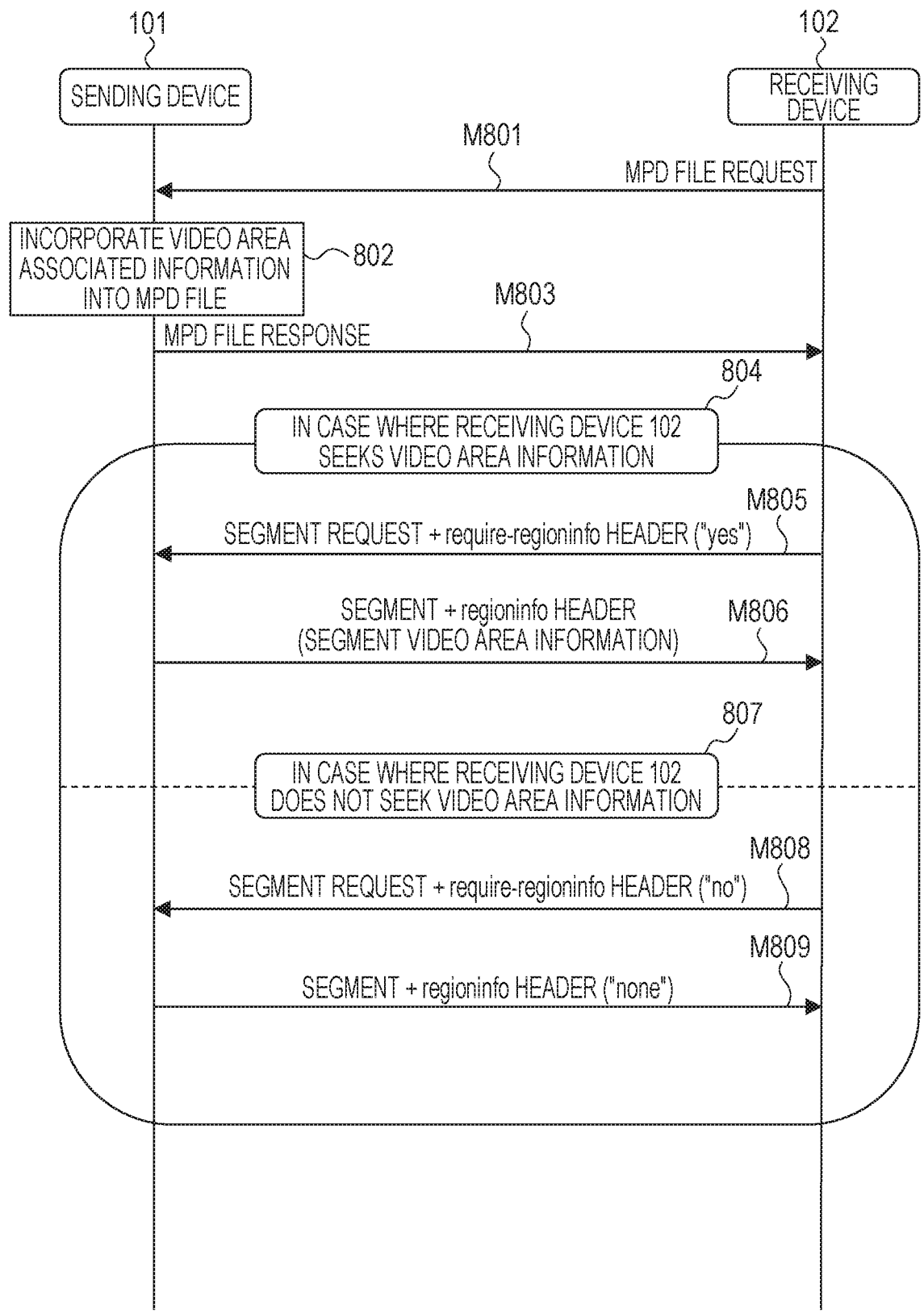
FIG. 9 is a sequence diagram of a first operation example.

For an example in which, for each segment, video area information is requested together with a segment request, a sequence representing an exchange between the sending device 101 and the receiving device 102 will be described with reference to FIG. 9.

In M801, the communication control unit 308 of the receiving device 102 sends an MPD file request to the sending device 101.

Through S614, in 802, the playlist generating unit 203 of the sending device 101 writes video area associated information in an MPD file.

In M803, the communication control unit 207 of the sending device 101 sends the MPD file.

Through S710, in M803, the communication control unit 308 of the receiving device 102 receives the MPD file from the sending device 101 and acquires the video arma associated information from the MPD file. In the first operation example, the receiving device 102 sends segment video area information request in the form of an HTTP header of a segment request. Then, the sending device 101 sends video area information in the form of an HTTP header of a segment response. A segment video area information request may be sent by another method, such as sending a segment video area information request by incorporating a parameter into a URL for a segment request. Video area information may be sent by another method, such as sending video area information in the form of meta data of segment data like movie fragment box (moof).

Since the sending device 101 does not support a stream video area information request or a stream video area information stop request, the receiving device 102 skips S701, S702, and S703, and the sending device 101 skips S601, S602, S603, and S604.

804 and 807 are respectively a process in the case where the receiving device 102 seeks video area information of a segment (s) and a process in the case where the receiving device 102 does not seek video area information of a segment(s).

First, 804 in the case where the receiving device 102 seeks video area information of a segment (s) will be described.

It is assumed that, through S704, the acquiring segment determining unit 307 of the receiving device 102 has acquired video area information of a certain one segment, and the acquiring segment determining unit 307 proceeds to S705.

Through S705, in M805, the communication control unit 308 of the receiving device 102 sends a segment request with a value "yes" set for require-regioninfo header as a segment video area information request to the sending device 101 based on an instruction from the acquiring segment determining unit 307. The require-regioninfo header is a header that is used when a request to acquire segment video area information or a request to stop segment video area information is sent. When a request is sent, "yes" is set; whereas, when a stop request is sent, "no" is set. In the present embodiment, a request to acquire segment video area information is a request to acquire all the types of video area information that the sending device 101 has. Alternatively, a parameter that designates the type(s) of video area information desired to be sent may be added, and the type(s) of video area information desired to be sent may be designated. When viewpoint coordinate information is designated, the communication control unit 308 may incorporate a parameter of an observation direction whose coordinate information is intended to be acquired based on an instruction from the acquiring segment determining unit 307. A value that the require-regioninfo header takes may be another value like "on" or "off". The receiving device 102 may use another header for sending a segment video area information request or a segment video area information stop request.

Through S605, the communication control unit 207 of the sending device 101 has received a segment request containing a require-regioninfo header whose value is "yes", so the communication control unit 207 proceeds to S606.

Through S606, the video area information management unit 206 of the sending device 101 enables a segment video area information sending setting for a segment for which a request has been received.

Through S609, the communication control unit 207 of the sending device 101 determines that the stream video area information sending setting of the video area information management unit 206 is in a disabled state and proceeds to S611.

Through S611, the communication control unit 207 of the sending device 101 determines that the segment video area information sending setting of the video area information management unit 206 is in an enabled state and proceeds to S612.

Through S612, in M806, the communication control unit 207 of the sending device 101 sends a segment response with video area information contained in a regioninfo header. The regioninfo header is a header that is used at the time when video area information of a segment is sent. The communication control unit 207 may send the regioninfo header in order to explicitly indicate that no video area information is sent. In this case, the regioninfo header takes a value of "none". The communication control unit 207 may use not a regioninfo header but another header.

Through S708, in M806, the communication control unit 308 of the receiving device 102 receives a segment response containing video area information as a value of regioninfo header.

Next, 807 in the case where the receiving device 102 does not seek video area information of a segment will be described.

Through S704, the acquiring segment determining unit 307 of the receiving device 102 does not intend to acquire video area information of a certain one segment and proceeds to S706.

Through S706, the acquiring segment determining unit 307 of the receiving device 102 prohibits the sending device 101 from sending video area information of the certain one segment and proceeds to S707.

Through S707, in M808, the communication control unit 308 of the receiving device 102 sends a segment request with a value "no" set for the require-regioninfo header as a segment video area information stop request to the sending device 101.

When the acquiring segment determining unit 307 of the receiving device 102 does not prohibit the sending device 101 from sending video area information of the segment, the acquiring segment determining unit 307 proceeds to S708 in S706. In this case, in M808, the communication control unit 308 of the receiving device 102 sends a segment request not containing a require-regioninfo header.

Through S605, the communication control unit 207 of the sending device 101 has not received a segment request containing a require-regioninfo header whose value is "yes", so the communication control unit 207 proceeds to S607.

Through S607, the communication control unit 207 of the sending device 101 has received a segment request containing a require-regioninfo header whose value is "no", so the communication control unit 207 proceeds to S608. When the communication control unit 308 of the receiving device 102 proceeds to S708 in S706, the sending device 101 proceeds to S606.

Through S608, the video area information management unit 206 of the sending device 101 disables a segment video area information sending setting for the segment for which a request has been received.

Through S609, the communication control unit 207 of the sending device 101 determines that the stream video area information sending setting of the video area information management unit 206 is in a disabled state and proceeds to S611.

Through S611, the video area information management unit 206 of the sending device 101 determines that the segment video area information sending setting is not in an enabled state and proceeds to S613.

In M809, the communication control unit 207 of the sending device 101 sends a segment response with a regioninfo header whose value is "null". The communication control unit 308 of the receiving device 102 receives the segment response. The communication control unit 207 of the sending device 101 does not need to incorporate a regioninfo header into a segment response.

The sending device 101 and the receiving device 102 respectively proceed from S613 to S601 and from S709 to S701 before finishing sending and receiving a stream, and repeat the process of 804 or 807.

Second Operation Example

Figure 10:
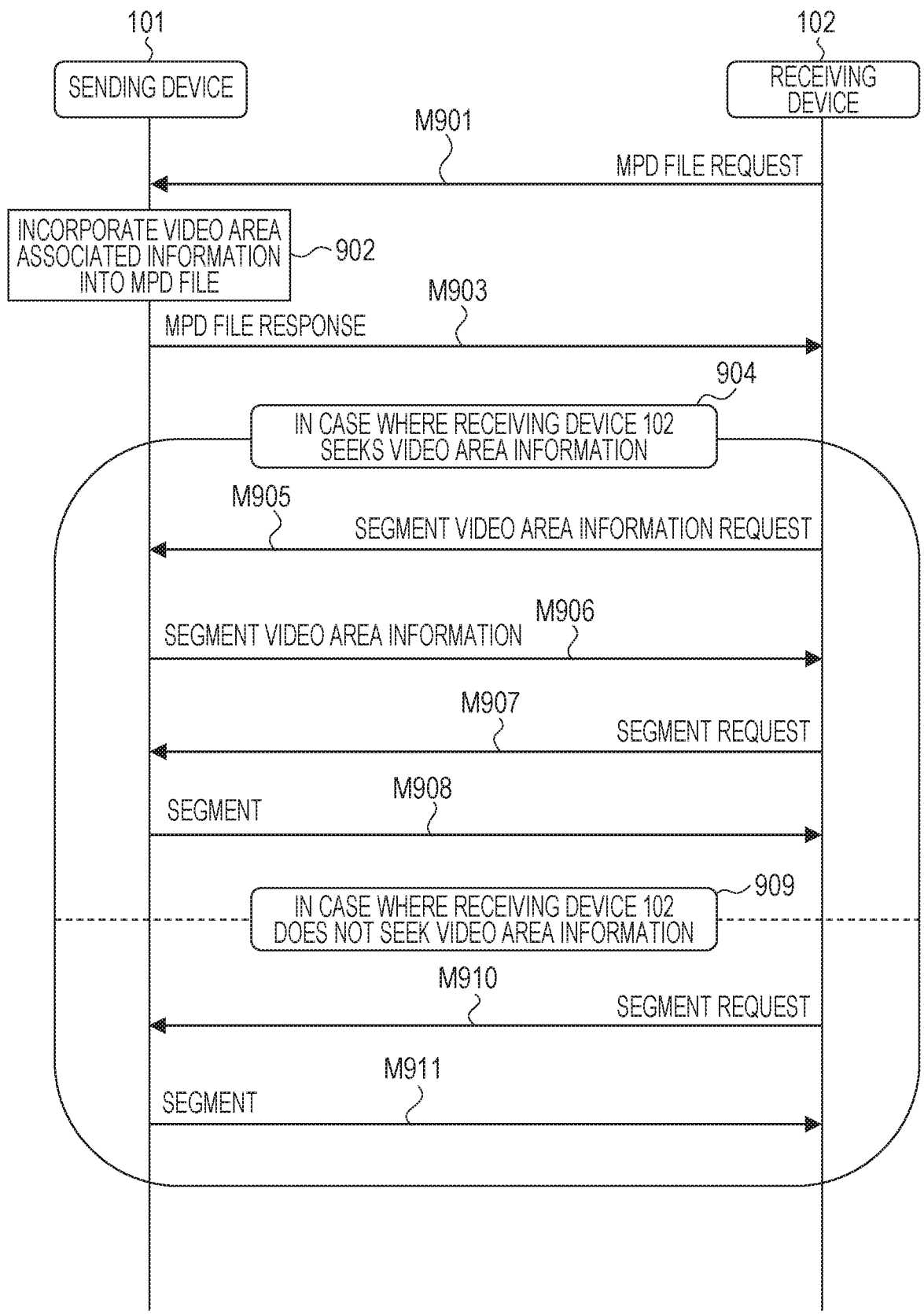
FIG. 10 is a sequence diagram of x second operation example.

For an example in which, for each segment, video area information is requested aside from a segment request, a sequence representing an exchange between the sending device 101 and the receiving device 102 will be described with reference to FIGS. 10.

M901 and 902 are similar to M801 and 802, so the description thereof is omitted.

Through S710, in M903, the communication control unit 308 of the receiving device 102 receives the MPD file from the sending device 101 and acquires the video area associated information from the MPD file. In the second operation example, it is assumed that video area information is sent or received by an HTTP GET request aside from a segment(s). However, the sending device 101 and the receiving device 102 may use another method, for example, exchanging video area information by using an RTP protocol for each segment.

904 and 909 are respectively a process in the case where the receiving device 102 seeks video area information of a segment (s) and a process in the case where the receiving device 102 does not seek video area information of a segment(s).

First, 904 in the case where the receiving device 102 seeks video area information of a segment(s) will be described.

It is assumed that, through S704, the acquiring segment determining unit 307 of the receiving device 102 has acquired video area information of a certain one segment, and the acquiring segment determining unit 307 proceeds to S705.

Through S705, in M905, the communication control unit 308 of the receiving device 102 sends an HTTP GET request to the sending device 101 as a segment video area information request. In the present embodiment, this is a request to get information of all the types in video area information that the sending device 101 has. Alternatively, the communication control unit 308 may designate the type (s) of video area information desired to be sent by, for example, adding a parameter for designating the type (s) of video area information desired to be sent, determined by the acquiring segment determining unit 307, to a URL. When viewpoint coordinate information is designated, the communication control unit 308 may incorporate a parameter of an observation direction whose coordinate information is intended to be acquired.

Through S605, the communication control unit 207 of the sending device 101 has received the HTTP GET request that is the segment video area information request, so the communication control unit 207 proceeds to S606.

Through S606, the video area information management unit 206 of the sending device 101 enables a segment video area information sending setting for the received segment video area information request.

Through S609, the communication control unit 207 of the sending device 101 determines that the stream video area information sending setting of the video area information management unit 206 is in a disabled state and proceeds to S611.

Through S611, the communication control unit 207 of the sending device 101 determines that the segment video area information sending setting of the video area information management unit 206 is in an enabled state and proceeds to S612.

Through S612, in M906, the communication control unit 207 of the sending device 101 sends video area information as a response to the HTTP GET request.

Through S708, in M906, the communication control unit 308 of the receiving device 102 receives video area information that is the response to the HTTP GET request.

In M907, the communication control unit 308 of the receiving device 102 sends a segment request corresponding to the video area information received in M906. The communication control unit 207 of the sending device 101 receives the segment request.

In M908, the communication control unit 207 of the sending device 101 sends a segment response communication control unit 308 of the receiving device 102 receives the segment response.

The sending device 101 and the receiving device 102 may send and receive the segment video area information request and then send and receive the segment request, and, after that, send and receive the video area information of a segment and the segment. In other words, the sending device 101 and the receiving device 102 may execute M905, M906, M907, and M908 in different order from the order of FIG. 10.

Alternatively, the sending device 101 and the receiving device 102 may exchange information in M905 and M906 multiple times and then may exchange information in M907 and M908 like the sending device 101 and the receiving device 102 send and receive video area information of a plurality of segments and then send and receive the segments.

Next, 909 in the case where the receiving device 102 does not seek video area information of a segment will be described.

It is assumed that, through S704, the acquiring segment determining unit 307 of the receiving device 102 does not intend to acquire video area information of a cert in one segment and proceeds to S706.

It is assumed that, through S706, the acquiring segment determining unit 307 of the receiving device 102 does not prohibit the sending device 101 from sending video area information of a certain one segment and proceeds to S706.

When the receiving device 102 prohibits the sending device 101 from sending the video area information of the segment, the receiving device 102 proceeds to S707 in S706. As in the case of the segment video area information request in M905, the communication control unit 308 sends a segment video area information stop request. The communication control unit 207 of the sending device 101 receives the segment video area information stop request.

Through S605, the communication control unit 207 of the sending device 101 has not received a segment video area information request, so the communication control unit 207 proceeds to S607.

Through S607, the communication control unit 207 of the sending device 101 has received the segment video area information stop request, so the communication control unit 207 proceeds to S608. Through S608, the communication control unit 207 of the sending device 101 disables the segment video area information sending setting and proceeds to S609.

Through S609, the communication control unit 207 of the sending device 101 determines that the stream video area information sending setting of the video area information management unit 206 is in a disabled state and proceeds to S611.

Through S611, the communication control unit 207 of the sending device 101 determines that the segment video area information sending setting of the video area information management unit 206 is not in an enabled state and proceeds to S613.

In M910, the communication control unit 308 of the receiving device 102 sends a segment request. The communication control unit 207 of the sending device 101 receives the segment request.

In M911, the communication control unit 207 of the sending device 101 sends a segment response. The communication control unit 308 of the receiving device 102 receives the segment response.

The sending device 101 and the receiving device 102 respectively proceed from S613 to S601 and from S709 to S701 before finishing sending and receiving a stream, and repeat the process of 904 or 909.

Third Operation Example

For an example in which a stream is requested to continue sending video area information, a sequence representing an exchange between the sending device 101 and the receiving device 102 will be described with reference to FIG. 11.

M1001 and 1002 are similar to M801 and 802, so the description thereof is omitted.

Through S710, in M1003, the communication control unit 308 of the receiving device 102 receives the MPD file from the sending device 101 and acquires the video area associated information from the MPD file. In the third operation example, it is assumed that the video area information of segments that make up a stream is sent or received by HTTP PUSH. Alternatively, the sending device 101 and the receiving device 102 may use another method, for example, a method of sending the video area information of segments by attaching the video area information to a segment response in the form of header information or metacata or a method of sending the video area information of segments by RTP protocol each time the video area information of each segment is prepared.

It is assumed that, through S701, the video area information acquisition instruction unit 306 of the receiving device 102 intends to continue acquiring video area information in stream and proceeds to S702.

It is assumed that, through S702, in M1004, the communication control unit 308 of the receiving device 102 sends a PUSH sending request to the sending device 101 as a stream video area information request. In the present embodiment, this is a request to get information of all the types in video area information that the sending device 101 has. Alternatively, the communication control unit 308 may designate the type (s) of video area information desired to be sent by adding a parameter designating the type(s) of video area information desired to be sent to a header for a PUSH sending request based on an instruction from the video area information acquisition instruction unit 306. When viewpoint coordinate information is designated, the communication control unit 308 may incorporate a parameter of an observation direction whose coordinate information is intended to be acquired based on an instruction from the video area information acquisition instruction unit 306.

Through S601, in M1004, the communication control unit 207 of the sending device 101 receives the PUSH sending request that is the stream video area information request and proceeds to S602.

Through S602, the communication control unit 207 of the sending device 101 enables a stream video area information setting.

1005 and 1009 are respectively a process in the case where the receiving device 102 receives video area information of segments and a process in the case where the receiving device 102 cancels reception of video area information.

First, 1005 in the case where the receiving device 102 receives the video area information of segments from the sending device 101 without cancellation will be described.

It is assumed that, through S704, the acquiring segment determining unit 307 of the receiving device 102 has acquired video area information of a certain one segment, and the acquiring segment determining unit 307 proceeds to S705.

Since the receiving device 102 has sent the stream video area information request to the sending device 101 and has enabled the stream video area information sending setting of the sending device 101, the communication control unit 308 proceeds to S708 without sending a segment video area information request in S705.

Through S605, the communication control unit 207 of the sending device 101 has not received a segment video area information request, so the communication control unit 207 proceeds to S607.

Through S607, the communication control unit 207 of the sending device 101 has not received a segment video area information stop request, so the communication control unit 207 proceeds to S609.

Through S609, the communication control unit 207 of the sending device 101 determines that the stream video area information sending setting of the video area information management unit 206 is in an enabled state and proceeds to S610.

Through S610, the communication control unit 207 of the sending device 101 determines that the segment video area information sending setting of the video area information management unit 206 is not in a disabled state and proceeds to S612.

Through S612, in M1006, the communication control unit 207 of the sending device 101 PUSH-sends the video area information of the segment to the receiving device 102.

In M1007, the communication control unit 308 of the receiving device 102 sends a segment request corresponding to the video area information received in M1006. The communication control unit 207 of the sending device 101 receives the segment request.

In M1008, the communication control unit 207 of the sending device 101 sends a segment response. The communication control unit 308 of the receiving device 102 receives the segment response.

The sending device 101 and the receiving device 102 may send and receive the segment request and then PUSH-send and receive the segment video area information, and, after that, send and receive a segment. In other words, the sending device 101 and the receiving device 102 may execute M1006, M1007, and M1008 in different order from the order of FIG. 11.

Alternatively, the sending device 101 and the receiving device 102 may execute M1006 multiple times and then may execute M1007 and M1008 like the sending device 101 and the receiving device 102 PUSH-send and receive video area information of a plurality of segments and then send and receive the segments.

Subsequently, 1009 in the case where the receiving device 102 cancels the video area information of segments from the sending device 101 will be described.

It is assumed that, through 5704, the acquiring segment determining unit 307 of the receiving device 102 does not intend to acquire video area information of a certain one segment and proceeds to S706.

It is assumed that, through S706, the acquiring segment determining unit 307 of the receiving device 102 prohibits the sending device 101 from sending video area information of the certain one segment and proceeds to S707.

Through S707, in M1010, the communication control unit 308 of the receiving device 102 sends a PUSH cancellation to the sending device 101 as a segment video area information stop request.

Through S605, the communication control unit 207 of the sending device 101 has not received a segment video area information request, so the communication control unit 207 proceeds to S607.

Through S607, the communication control unit 207 of the sending device 101 has received the segment video area information stop request, so the communication control unit 207 proceeds to S608.

Through S608, the video area information management unit 206 of the sending device 101 disables the segment video area information sending setting for the video area information for which the PUSH cancellation has been received.

Through S609, the communication control unit 207 of the sending device 101 determines that the stream video area information sending setting of the video area information management unit 206 is in an enabled state and proceeds to S610.

Through S610, the communication control unit 207 of the sending device 101 determines that the segment video area information sending setting of the video area information management unit 206 is in a disabled state and proceeds to S613.

In M1010, the communication control unit 308 of the receiving device 102 sends a segment request. The communication control unit 207 of the sending device 101 receives the segment request.

In M1011, the communication control unit 207 of the sending device 101 sends a segment response. communication control unit 308 of the receiving device 102 receives the segment response.

The sending device 101 and the receiving device 102 may be configured to set a plurality of pieces of video area information for cancellation targets with a single PUSH cancellation request or successively send PUSH cancellation. requests. In other words, the sending device 101 and the receiving device 102 may execute M1010 multiple times and then may execute M1011 and M1012.

The sending device 101 and the receiving device 102 respectively proceed from S613 to S601 and from S709 to S701 before finishing sending and receiving a stream, and repeat the process of 1005 or 1009. During this repetition, when the receiving device 102 intends to finish continuous sending of video area information for a stream, the receiving device 102 proceeds from S701 to S703. In S703, the communication control unit 207 sends a PUSH sending cancellation of all the pieces of video area information to the sending device 101. The sending device 101 proceeds to S604 in S603. In S604, the video area information management unit 206 disables the stream video area information sending setting and stops sending video area information.

As described above, according to the present embodiment, the sending device 101 sends video area information to the receiving device 102, and the receiving device 102 receives the video area information. Thus, the receiving device 102 is able to acquire information. concerning a change in the area of video. In other words, even when the image capturing range of a camera changes during distribution of video captured by the camera, the receiving device 102 is able to continue displaying video in accordance with user's intention since information concerning the change is provided. More specifically, by using information concerning the change, the receiving device 102 is able to display video in the same range regardless of a change in the orientation of the camera, a zoom ratio, or the like, or change the range of video to be displayed according to a change in the orientation of the camera, a zoom ratio, or the like.

According to the present embodiment, video area information can be requested as the header information of a segment request for each segment, and video area information can be sent or received as the header information of a segment response. A request for video area information and sending and receiving of video area information can be performed as a transaction different from a segment request-response for each segment. A stream can be requested to continue sending video area information.

The present embodiment mainly describes the example in which part of all-sky video data is sent from the sending device 101 to the receiving device 102; however, data gnat is sent from the sending device 101 to the receiving device 102 is not limited to all-sky video data. In other words, the configuration of the present embodiment is applicable to a system in which part or all of the range of video data held by the sending device 101 is sent to the receiving device 102.

Other Embodiments

The present invention can be implemented by the following process. A program that implements one or more functions of the above-described embodiment is supplied to a system or device via a network or a storage medium. One or more processors in a computer of the system or device reads and runs the program. Alternatively, the present invention may be implemented by a circuit (for example, ASIC) that implements one or more functions.

An example of the embodiment of the present invention is described in detail; however, the present invention is not limited to such a specific embodiment.

According to the above-described embodiment, a change in the orientation of the camera 409 of the sending device 101 can be handled without increasing the number of transactions. A change in the orientation of the camera 409 of the sending device 101 during a segment can be handled.

Thus, a change in the orientation of the camera 409 of the sending device 101 can be handled.

According to the embodiment of the present invention, even when an image capturing range of a camera changes during distribution of video captured by the camera, video intended by a user is made easy to be distributed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A sending device that sends, to a receiving device, a content divided into segments using MPEG-DASH protocol, the sending device comprising:
   a generating unit configured to generate MPD file in which a playlist containing a URL that allows access to each segment is described and a video area information of each segment, the video area information is information of at least one type or combination of some types among viewpoint information, field of view (FOV), viewpoint movement information, viewpoint coordinate information, and observation position information; and
   a communication control unit configured to send, to the receiving device, the MPD file generated by the generating unit in response to a request for the MPD file from the receiving device,
   wherein the communication control unit is further configured to send, to the receiving device, the video area information of each segment in response to a request for the each segment from the receiving device.

2. The sending device according to claim 1, wherein the content is video of an all-sky image having images in all directions in a three-dimensional space.

3. The sending device according to claim 1, wherein the communication control unit is configured to send, to the receiving device, the video area information as meta data of each segment.

4. The sending device according to claim 1, wherein the communication control unit is configured to send, to the receiving device, a header, including the video area information, in sending each segment.

5. The sending device according to claim 1, wherein the communication control unit is configured to send, to the receiving device, the video area information aside from each segment.

6. The sending device according to claim 1, wherein the generating unit is configured to contain a URL for identifying the video area information into the MPD file.

7. The sending device according to claim 1, wherein the generating unit is configured to contain protocol information for sending the video area information into the MPD file.

8. The sending device according to claim 1, wherein the generating unit is configured to contain a type of information, contained in the video area information, into the MPD file.

9. A receiving device that receives, from a sending device, a content divided into segments using MPEG-DASH protocol, the receiving device comprising:
   a decoding unit configured to decode the content based on the segments received from the sending device and video area information of each segment; and
   an output control unit configured to output the content decoded by the decoding unit,
   wherein the content decoded is an MPD file in which a playlist containing a URL that allows access to each segment is described and the video area information of each segment, the video area information is information of at least one type or combination of some types among viewpoint information, field of view (FOV), viewpoint movement information, viewpoint coordinate information, and observation position information.

10. The receiving device according to claim 9, wherein the content is video of an all-sky image having images in all directions in a three-dimensional space.

11. The receiving device according to claim 9, wherein the video area information is information of at least one type or combination of some types among viewpoint information, field of view (FOV), viewpoint movement information, viewpoint coordinate information, and observation position information.

12. An information processing method that is executed by a sending device that sends, to a receiving device, a content divided into segments using MPEG-DASH protocol, the information processing method comprising:
   a generating step of generating MPD file in which a playlist containing a URL that allows access to each segment is described and a video area information of each segment, the video area information is information of at least one type or combination of some types among viewpoint information, filed of view (FOV), viewpoint movement information, viewpoint coordinate information, and observation position information;

a first sending step of sending, to the receiving device, the MPD file generated in the generating step in response to a request for the MPD file from the receiving device; and a second sending step of sending, to the receiving device, the video area information of each segment in response to a request for the each segment from the receiving device.

13. An information processing method that is executed by a receiving device that receives, from a sending device, a content divided into segments using MPEG-DASH protocol, the information processing method comprising:

a decoding step of decoding the content based on the segments received from the sending device and video area information of each segment; and an output controlling step of outputting the content decoded in the decoding step, wherein the content decoded is an MPD file in which a playlist containing a URL that allows access to each segment is described and the video area information of each segment, the video area information is information of at least one type or combination of some types among viewpoint information, field of view (FOV), viewpoint movement information, viewpoint coordinate information, and observation position information.

14. A non-transitory computer readable storage medium that stores a program for causing a computer to execute a method that is executed by a sending device that sends, to a receiving device, a content divided into segments using MPEG-DASH protocol, the information processing method comprising:

a generating step of generating MPD file in which a playlist containing a URL that allows access to each segment is described and a video area information of each segment, the video area information is information of at least one type or combination of some types among viewpoint information, field of view (FOV), viewpoint movement information, viewpoint coordinate information, and observation position information;

a first sending step of sending, to the receiving device, the MPD file generated in the generating step in response to a request for the MPD file from the receiving device; and a second sending step of sending, to the receiving device, the video area information of each segment in response to a request for the each segment from the receiving device.

15. A non-transitory computer readable storage medium that stores a program for causing a computer to execute a method that is executed by a receiving device that receives, from a sending device, a content divided into segments using MPEG-DASH protocol, the information processing method comprising:

a decoding step of decoding the content based on the segments received from the sending device and video area information of each segment; and an output controlling step of outputting the content decoded in the decoding step, wherein the content decoded is an MPD file in which a playlist containing a URL that allows access to each segment is described and the video area information of each segment, the video area information is information of at least one type or combination of some types among viewpoint information, field of view (FOV), viewpoint movement information, viewpoint coordinate information, and observation position information.

* * * * *